US Patent 3,555,120
Patented Jan. 12, 1971

3,555,120
ABS RESIN HAVING VERY HIGH IMPACT STRENGTH AND HIGH HEAT DEFLECTION TEMPERATURE
Edward M. Hagerman, Royal Oak, Mich., assignor to General Motors Corporation, Detroit, Mich., a corporation of Delaware
No Drawing. Filed Sept. 15, 1967, Ser. No. 668,160
Int. Cl. C08f 15/04, 15/22
U.S. Cl. 260—880
2 Claims

ABSTRACT OF THE DISCLOSURE

A styrene-acrylonitrile grafted polybutadiene composition wherein the polybutadiene is polymerized to a high molecular weight, characterized by a limiting viscosity number of at least 1.6 in benzene at 30° C., has a Izod impact strength at about room temperature of greater than 10 foot pounds per inch of notch and a heat deflection temperature greater than 85° C.

---

Acrylonitrile-butadiene-styrene resins are recognized as thermoplastic materials of relatively high impact strength. They frequently are molded into articles which are expected to operate under conditions normally considered quite severe for thermoplastics. The ABS polymers include a resin component, styrene-acrylonitrile copolymer, and an elastomer component, polybutadiene. Heretofore, the properties of the final product have been a compromise usually dictated by the relative concentrations of the elastomer and resin constitutents. When a particular product application required high impact strength, the elastomer content would be increased to provide toughness. When a higher heat deflection temperature was required, the resin content could be increased at the expense of the elastomer to yield a thermoplastic employable at somewhat higher temperatures. However, in the prior art one could not expect to produce ABS compositions having Izod impact strength (ASTM D-256-56) values markedly greater than those displayed by conventional formulations without experiencing a concomitant reduction in the heat deflection temperature (ASTM D-648-56). Heretofore, the individual constituents in the ABS system have been chemically modified in an attempt to produce better overall physical properties. No modification of the ABS system has been devised which is competitive with the parent on both a physical property and cost basis. Also, techniques have been developed to graft styrene-acrylonitrile copolymer to the polybutadiene chains to form a terpolymer. In some ABS compositions the chemical bond between the polybutadiene and at least a portion of the styrene-acrylonitrile copolymer provided better properties than was obtainable in simple mixtures of the elastomeric and resin constituents. However, none of these techniques have succeeded in producing a single resin having an Izod impact strength at 73° F. greater than about 10 foot pounds per inch of notch and a heat deflection temperature at 264 p.s.i. greater than 85° C. (unannealed specimen).

Accordingly, it is an object of the present invention to provide a specific acrylonitrile-butadiene-styrene composition having exceptionally desirable physical properties for such materials as characterized by an Izod impact strength determined according to ASTM D-256-56 of greater than 10 foot pounds per inch of notch and a heat deflection temperature as determined with an unannealed sample by ASTM D-648-56 at 264 pounds per square inch of greater than 85° C. (185° F.).

It is another object of the present invention to provide an ABS thermoplastic composition of relatively inexpensive commercially available materials having a combination of physical properties heretofore unobserved in ABS resins.

It is a further object of the present invention to provide a tough, high temperature resistant ABS resin by modifying the molecular weight of the polybutadiene component and simultaneously controlling the amount and composition of the styrene-acrylonitrile copolymer component.

In accordance with the invention, these and other objects are accomplished by preparing a styrene-acrylonitrile grafted polybutadiene material wherein the molecular weight of the polybutadiene component is in the range of about 250,000 to 400,000. Substantially pure monomeric butadiene is polymerized by an emulsion process wherein the concentration of chain modifier is carefully controlled to obtain a high molecular weight product. The molecular weight of the polybutadiene may be suitably characterized by determining the limiting viscosity number of the polymer in benzene solution at 30° C. Under these conditions a limiting viscosity number of at least 1.6 is required. Styrene and acrylonitrile are added to the polybutadiene latex together with suitable additional emulsifier, initiator and modifier. Preferably, a ratio of about 76 parts of styrene to 24 parts of acrylonitrile is employed. The emulsion copolymerization reaction is conducted whereby a mixture of styrene-acrylonitrile grafted polybutadiene terpolymer and styrene-acrylonitrile copolymer is obtained. Preferably, polybutadiene comprises 20–30% by weight of the mixture and 50–75% of the styrene-acrylonitrile copolymer is grafted to the polybutadiene through covalent bonds. The resultant latex is coagulated and dried to powder form. The powder may be molded, or processed by other conventional thermoplastic resin handling techniques, into tough, heat resistant articles of manufacture.

A specific example of the preparation of my ABS resin will further illustrate the principles of the invention. In the initial step, high molecular weight polybutadiene is prepared in latex form by an emulsion polymerization technique. Forty-five (45) parts of butadiene, 100 parts water, 4 parts sodium oleate (emulsifier), 0.1 part ter-dodecylmercaptan (modifier), 0.40 part potassium persulfate (initiator) were mixed together and stirred in an autoclave at 50° C. for sixteen hours. The reaction mixture was removed from the autoclave and the pressure released. A portion of unreacted monomeric butadiene escaped by vaporization at this time. The remainder of unreacted butadiene was stripped from the latex with steam. The conversion of butadiene monomer to polymer was determined to be about 60%. A small sample of the latex was taken and the polybutadiene coagulated and dried. The limiting viscosity number of dilute benzene solutions of the polymer at 30° C. was determined to be 1.85. The weight average molecular weight of the polymer was calculated to be about 300,000.

A portion of the resultant polybutadiene latex containing 20 parts polybutadiene was diluted with water to a total of 203 parts. Styrene—45.6 parts, acrylonitrile—14.4 parts, sodium oleate—4.0 parts, ter-dodecylmercaptan—0.2 part, and potassium persulfate—0.4 part were added to polybutadiene latex. The emulsion was maintained at 50° C. for six hours.

The resultant latex was creamed with 5% sodium chloride solution, coagulated with 5% sulfuric acid solution, filtered, washed with water and methanol and dried to yield styrene-acrylonitrile grafted polybutadiene terpolymer and free styrene-acrylonitrile copolymer as a powder. The conversion of monomer to polymer was about 88.5%. The resultant product contained 28% by weight polybutadiene. The dry resin was milled at 340–350° F. and molded for fifteen minutes at 350° F. and twenty tons force into Izod test specimens and heat deflection test bars. The notched Izod impact strength of the resin according to ASTM D-256-56 was determined to be 12.7 foot pounds per inch of notch at 73° F. Heat deflection temperature according to ASTM D-648-56 (unannealed specimen) at 264 p.s.i. was found to be 92° C. (197.6° F.).

In general, to obtain the excellent overall physical properties characterized in the above example, I have found that my ABS resin must contain 20-30% by weight high molecular weight polybutadiene and the balance styrene-acrylonitrile copolymer. Over half and preferably 50-75% of the copolymer is grafted to the polybutadiene, the remainder existing substantially as free copolymer. The copolymer itself essentially consists of 72-80% by weight styrene and the balance acrylonitrile. For the most part, the preparation of the terpolymer-copolymer mixture is accomplished by conventional emulsion polymerization techniques. However, it is critical that the concentration of the chain modifier employed be kept low to obtain relatively high molecular weight polybutadiene. Based upon 45 parts of monomeric butadiene as described in the above example, a suitable polybutadiene may be obtained by employing 75-150 parts water, 2-6 parts sodium oleate, less than 0.15 part ter-dodecylmercaptan, and .2 to .5 part potassium persulfate. In the subsequent grafting step in which styrene and acrylonitrile are copolymerized the quantities of emulsifier, initiator and chain modifier may be varied about ±20% from the proportions set forth in the above examples.

With polybutadiene having a molecular weight in the range of about 250,000 to about 400,000 the resulting grafted terpolymer-copolymer has exceptional physical properties. Izod impact strengths are realized of at least about 10 foot pounds per inch of notch to about 13 foot pounds per inch of notch or higher. These values in themselves are substantially above impact strengths found in currently available commercial materials. An additional surprising factor is that at the same time the resin has an extraordinary high heat deflection temperature for a resin of this toughness. Heat deflection temperatures of 85° C. (185° F.) or higher on unannealed samples are readily obtainable in the above-defined ABS resins wherein the polybutadiene has a molecular weight greater than 250,000. I have found that with a polymer molecular weight above 400,000, the polybutadiene latex commences to gel and becomes unmanageable for the further processing which is necessary to produce the terpolymer.

The molecular weight of the polybutadiene is suitably characterized in accordance with the subject invention by determination of the limiting viscosity number of dilute benzene solutions of the polymer. Viscosity measurements of polymer solutions are readily made in most chemical laboratories and are quick, inexpensive means of estimating the molecular weight of the polymer. The value of the viscosity of a polymer solution is a function of the polymer, its molecular weight, the solvent employed and the temperature at which the solution is tested. In the case of polybutadiene prepared as in the above example, I have found that limiting viscosity numbers in excess of 1.6 as determined from viscosity measurements of dilute benzene solutions of the polymer at 30° C. are suitable for purposes of the invention. As is well known, limiting viscosity numbers may be determined by measuring viscosity of polymer solutions at varying concentrations, plotting viscosity numbers and/or logarithmic viscosity numbers vs. polymer concentration and extrapolating to zero polymer concentration to obtain the limiting viscosity number. As noted, the resulting value is characteristic of the molecular weight of the resin. Other techniques may be employed to obtain absolute values of the molecular weight and if desired, in many instances a correlation made with viscosity data such that it may be used to estimate molecular weight.

The molecular weight of styrene-acrylonitrile copolymer in the subject resin cannot be readily measured in that environment. Accordingly, the molecular weight of these materials cannot be specified. However, the resin constituents comprise 7-80% of the ABS composition and styrene makes up 72-80% of the copolymer mixture. It is also preferred that the copolymer be prepared according to the general techniques described in the above example. Such copolymer compositions in conjunction with the high molecular weight polybutadiene have been found to produce the resins having highly desirable thermoplastic physical properties of this invention.

While my invention has been described in terms of a specific embodiment, it will be realized by those skilled in the art that other forms may readily be adapted and the scope of the invention should be considered limited only by the following claims.

I claim:
1. A styrene-acrylonitrile grafted polybutadiene material consisting substantially by weight of 20-30% polybutadiene and the balance styrene-acrylonitrile copolymer, wherein about 50-75% by weight of said copolymer is grafted to said polybutadiene through covalent bonds, the remainder existing as free copolymer, said styrene-acrylonitrile copolymer consisting of 72-80% by weight styrene, and the molecular weight of said polybutadiene being in the range of 250,000 to 400,000 whereby the Izod impact strength as determined by ASTM D-256-56 is at least 10 foot pounds per inch of notch and the heat deflection temperature of said resin in the unannealed state as determined by ASTM D-648-56 is at least 85° C.

2. Styrene-acrylonitrile grafted polybutadiene material consisting substantially by weight of 20-30% polybutadiene and the balance styrene-acrylonitrile copolymer wherein about 50-75% by weight of said copolymer is grafted to said polybutadiene through covalent bonds, the remainder existing as free copolymer, said styrene-acrylonitrile copolymer consisting of 72-80% by weight styrene, and said polybutadiene having a relatively high molecular weight as characterized by a limiting viscosity number greater than about 1.6 as determined in benzene at 30° C. whereby the Izod impact strength of said resin as determined by ASTM D-256-56 is at least 10 foot pounds per inch of notch and the heat deflection temperature of said resin in the unannealed state as determined by ASTM D-648-56 is at least 85° C.

References Cited
UNITED STATES PATENTS

| | | | |
|---|---|---|---|
| 2,820,773 | 1/1958 | Childers et al. | 260—880 |
| 2,948,703 | 8/1960 | Schroeder | 260—880 |
| 3,267,175 | 8/1966 | Grabowski | 260—880 |
| 3,346,520 | 10/1967 | Lee | 260—880 |
| 3,442,979 | 5/1969 | Ott et al. | 260—880 |

FOREIGN PATENTS

| | | | |
|---|---|---|---|
| 867,822 | 5/1965 | Great Britain | 260—880 |

JAMES A. SEIDLECK, Primary Examiner

U.S. Cl. X.R.

260—876